Aug. 7, 1951 G. P. DE MENGEL 2,562,894

STABILIZED ELECTRIC OSCILLATOR

Filed Jan. 5, 1946 3 Sheets-Sheet 1

Inventor
Gaston Pakenham DeMengel by

Robert Harding Jr.
Attorney.

Aug. 7, 1951 G. P. DE MENGEL 2,562,894

STABILIZED ELECTRIC OSCILLATOR

Filed Jan. 5, 1946 3 Sheets-Sheet 2

Inventor
Gaston Pakenham De Mengel
by
Robert Harding Jr.
Attorney

Aug. 7, 1951 G. P. DE MENGEL 2,562,894

STABILIZED ELECTRIC OSCILLATOR

Filed Jan. 5, 1946 3 Sheets-Sheet 3

Inventor
Gaston [illegible] DeMengel
by
[signature]
Attorney

Patented Aug. 7, 1951

2,562,894

UNITED STATES PATENT OFFICE 2,562,894

STABILIZED ELECTRIC OSCILLATOR

Gaston Pakenham de Mengel, London, England, assignor, by mesne assignments, to International Standard Electric Corporation, New York, N. Y., a corporation of Delaware Application January 5, 1946, Serial No. 639,292
In Great Britain February 23, 1945

15 Claims. (Cl. 250—36)

The present invention relates to arrangements for stabilising the frequency and output amplitude of electric oscillators.

It is well known that in the case of oscillation circuits employing electron discharge devices or valves, maintenance of the oscillations at some steady amplitude depends upon the presence of some non-linear impedance element in the circuit, that is an element whose impedance varies with the current flowing through it. In a large number of well known circuits, the valve itself provides the non-linear element, limitation of the amplitude occurring either by the diode action of the control grid or by the curvature of the anode current-grid voltage characteristic. It has been shown that this type of non-linearity is a fundamental cause of changes in oscillation frequency when the valve supply voltages are changed. The effect is probably due to the changes of energy distribution among the harmonics which are the result of the amplitude limitation.

This major cause of instability has been largely removed in the past by the use of a thermally sensitive resistance element such as a thermistor in the circuit associated with the valve for the purpose of controlling the amplitude. In such a case the circuit elements are so proportioned that the valve operates only over the straight portion of its characteristic curve, grid current limitation being carefully avoided. The changes in resistance of the thermal element are relatively slow, and it cannot follow the instantaneous changes in current, so that for any given amplitude of oscillation it acts substantially as an ordinary resistance. Any change in amplitude causes a compensating change in the resistance of the thermal element, and so in this way harmonics are not generated thereby.

Some of the circuits so far used involve a Wheatstone bridge arrangement necessitating the use of transformers at the input and output of the amplifier portion of the circuit; others involve a bridged T "null" circuit. The first of these types is suitable only for single frequency operation, while the second is not suitable for high frequency operation owing to the spurious phase shifts introduced at high frequencies by the input and output capacities of the amplifier.

When a high degree of frequency stability is required, it is, of course essential that changes of frequency do not occur as a result of the changes in resistance of the thermal element. Unless some care is taken in the design of the oscillation circuit this is liable to happen. The present invention is concerned with oscillation circuit arrangements stabilised by thermally sensitive elements in which the resistance changes are prevented from affecting the frequency, and differing in essential features from either of the types just mentioned. In these new arrangements the interelectrode impedances of the valve or other electron discharge device are caused to form part of the oscillation circuit in such a way that variations of their resistive components do not affect the frequency, which is determined substantially only by the circuit reactances.

According to the invention, there is provided an arrangement for generating electric oscillations comprising an amplifying arrangement having an input electrode, an output electrode and a cathode or cathodes; a coupling network having impedance branches effectively connected respectively between the said input and output electrodes and between each electrode and its corresponding cathode; and means adapted to be controlled by the voltage across one of the said branches for stabilising the amplitude of the oscillations substantially at a specified value.

The invention also provides an arrangement for generating electric oscillations comprising an amplifying arrangement having an input electrode, an output electrode, and a cathode or cathodes; a coupling network having impedance branches connected respectively between the said input and output electrodes and between each and its corresponding cathode; and a temperature dependent resistance element connected in at least one of the said branches in such manner as to stabilise the amplitude of the oscillations substantially at a specified value.

The invention further provides an arrangement for generating electric oscillations comprising an electron discharge device having a cathode electrode, an input electrode and an output electrode, a coupling network having a plurality of impedance branches connecting the said input and output electrodes, a temperature dependent resistance element in at least one of the said branches, each of the inter-electrode impedances of the device being connected in parallel with one of the said branches, the arrangement being such that the amplitude of the oscillations is stabilised by the temperature dependent resistance element substantially at a specified value.

In another form the invention provides an arrangement for generating electric oscillations comprising two electron discharge devices each having a cathode, an input electrode and an output electrode, two impedance branches respectively connecting the said output electrodes to the corresponding cathodes, a third impedance branch connecting the said output electrodes together, a temperature dependent resistance element connected in the said third branch and means for connecting the output electrode of each device to the input electrode of the other, the temperature dependent resistance element being adapted to stabilise the amplitude of the oscillations substantially at a specified value.

The invention will be explained with reference to the accompanying drawings, in which.

Figure 1:
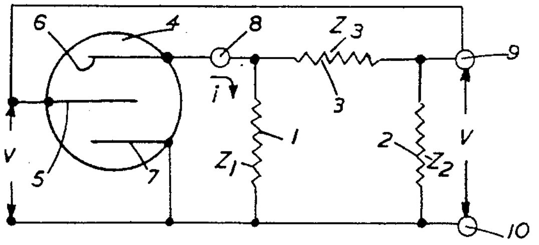
Fig. 1 shows a simplified circuit diagram employed to explain the basis of the invention.

In the simplified diagram illustrating the principles of the invention shown in Fig. 1, there is shown an unbalanced coupling network of two shunt impedance elements 1 and 2, and a series element 3 of which the respective impedances are $Z_1$, $Z_2$ and $Z_3$ respectively. An electron discharge device 4 is provided with an input electrode 5, an output electrode 6 and a common cathode electrode 7. This device has a mutual conductance $g$ defined as the ratio of the current obtained from the output electrode 6, to the voltage applied between the input electrode 5 with respect to the common electrode 7.

The output electrode of the device 4 is connected to the input terminal 8 of the coupling network, and the output terminal 9 thereof is connected to the input electrode 5. The unipotential terminal 10 of the network is connected to the common electrode 7 of the device 4.

The impedances $Z_1$, $Z_2$ and $Z_3$ are intended to include the internal impedances between the electrodes of the device 4.

In order to explain the conditions for oscillation, it will first be supposed that the connection between the electrodes 9 and 5 is broken without removing the internal impedance between the electrodes 5 and 6 which acts in parallel with $Z_3$.

Let $v$ be an alternating voltage applied between the electrodes 5 and 7. Then it is well known that the device will behave as though it supplied a current $i$ from the electrode 6 to the terminal 8 of the coupling network, where $i=-vg$. The resulting voltage between the output terminals 9, 10 of the coupling network will be $V=iZ_t$ where $Z_t$ is the transfer impedance of the coupling network, and is equal to $$Z_1Z_2/(Z_1+Z_2+Z_3)$$

so $$V=iZ_1Z_2/(Z_1+Z_2+Z_3)=-vgZ_1Z_2/(Z_1+Z_2+Z_3)$$

The condition for the maintenance of oscillations when the connection between the electrodes 9 and 5 is restored is that $$V=v, \text{ or } gZ_1Z_2+Z_1+Z_2+Z_3=0 \qquad (1)$$

In general, all of the Z impedances will contain both resistive and reactive components. It will be convenient to make substitutions corresponding to each of the Z impedances in the form $$1/Z=1/R+1/jX \qquad (2)$$

and to rewrite Equation 1 in the form $$g+\frac{1}{Z_1}+\frac{1}{Z_2}+\frac{Z_3}{Z_1Z_2}=0 \qquad (3)$$

This equation must be satisfied after substitutions corresponding to (2) have been made.

There are, of course, a variety of possible circuits which can be designed to fulfil the conditions. When, as in the case of the present invention, it is desired that the frequency of oscillation shall be determined only by the reactances of the circuit, so that it is independent of any of the resistance components or of $g$, then it can be shown that since none of the resistance components of the Z impedances can be negative, condition (1) or (3) cannot be satisfied unless $g$ is negative. Thus a single ordinary triode could not be used for the device 4. However, it is well known that by appropriately arranging a multi-grid valve an equivalent triode can be produced having a negative mutual conductance which can be employed for the device 4 in order to fulfil the condition (1) or (3).

If further one of the shunt impedances includes a suitably arranged temperature-dependent resistance such as a thermistor, then the oscillation amplitude can be stabilised since any change of amplitude would cause the violation of condition (1) or (3) due to the change in the value of the corresponding Z impedance. It is evident that the direction of variation of the temperature dependent resistance should be such as to tend to correct any variation of the amplitude of the oscillations.

The present invention consists in the employment of an oscillation circuit of the type of Fig. 1, and a temperature dependent resistance in the coupling network for stabilising the oscillations. Although generally when a single electron discharge device is used, it must have a negative mutual conductance (or an equivalent arrangement), there is a push-pull type of circuit to be described later which fulfils the conditions while employing two ordinary triodes.

Figure 2:
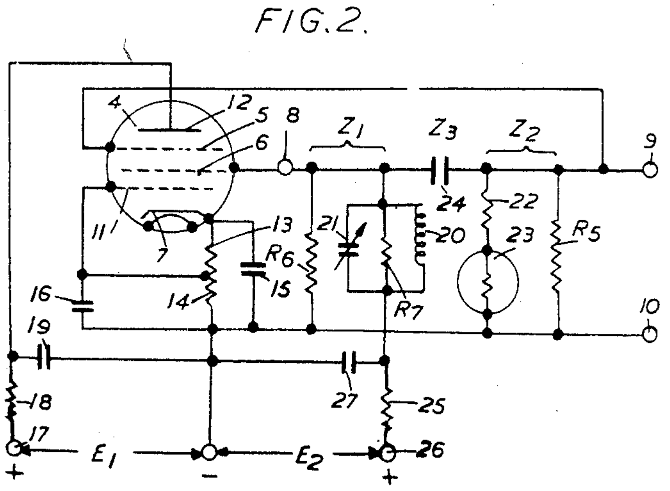
Fig. 2 shows a schematic circuit diagram of an embodiment in accordance with Fig. 1.

Fig. 2 shows an embodiment of the invention in accordance with Fig. 1. The device 4 is a pentode valve having a cathode 7, a suppressor grid 5 serving as the input electrode, a screen grid 6 serving as the output electrode, a control grid 11, and an anode 12. A bias network consisting of two resistances 13 and 14 shunted by a condenser 15 is connected in series with the cathode 7, and the control grid 11 is connected to the junction point of the resistances 13 and 14. A by-pass condenser 16 is provided for the control grid. This arrangement enables appropriate bias to be applied separately to the electrodes 6 and 11 in order to ensure that no non-linear distortion is introduced by the valve. Any other convenient biassing arrangement may also be used. The anode 12 is connected to the positive terminal 17 of a direct current source having a voltage $E_1$ through a decoupling resistance 18, a corresponding by-pass condenser 19 being provided.

The impedance $Z_1$ of Fig. 1 comprises two portions, namely a resistance $R_6$ corresponding to the internal resistance of the valve between the electrodes 6 and 7, and not representing any actual circuit element, and a parallel resonant circuit comprising an inductance 20 shunted by a condenser 21. A shunt resistance $R_7$ is introduced to represent the effective parallel resistance of the resonant circuit and does not correspond to any actual circuit element.

The impedance $Z_2$ also comprises two portions, namely a resistance $R_5$ representing the internal resistance between the electrodes 5 and 7 of the valve, and not corresponding to any circuit element, and a shunt comprising a resistance 22 connected in series with a directly heated thermistor 23 having a negative temperature coefficient of resistance. Thermistors suitable for this purpose are described, for example in British Patent Specification No. 545,679 or 555,563 or 557,541.

The impedance $Z_3$ is represented only by a large blocking condenser 24, so that $Z_3$ is substantially zero.

The screen grid 6 is connected through the inductance 20 and a decoupling resistance 25 to the positive terminal 26 of a direct current source having a voltage $E_2$ which should be greater than $E_1$. The by-pass condenser is 27. The two sources of voltage $E_1$ and $E_2$ need not be separate as shown, but might be derived from a single source as is the usual practice.

The oscillations may be obtained from the output terminals 9 and 10, which should preferably be connected to an amplifying valve (not shown), or other high impedance load circuit in any convenient manner.

By putting $Z_3=0$, condition (1) may be rewritten for Fig. 2 in hte form:

$$g+\frac{1}{Z_1}+\frac{1}{Z_2}=0$$

substituting $$\frac{1}{Z_1}=\frac{1}{R_1}+\frac{1}{jX_1}$$

and $$\frac{1}{Z_2}=\frac{1}{R_2}+\frac{1}{jX_2}$$

it follows that $$\frac{1}{X_1}+\frac{1}{X_2}=0 \qquad (4)$$

and $$g+\frac{1}{R_1}+\frac{1}{R_2}=0$$

or since $$\frac{1}{R_1}=\frac{1}{R_7}+\frac{1}{R_6}$$

and $$\frac{1}{R_2}=\frac{1}{R_t}+\frac{1}{R_5}$$

it follows that $$g+\frac{1}{R_6}+\frac{1}{R_7}+\frac{1}{R_t}+\frac{1}{R_5}=0 \qquad (5)$$

where $R_t$ is the combined resistance of the elements 22 and 23. The oscillation amplitude will accordingly adjust itself until the resistance $R_t$ reaches the value given by Equation 5. An increase in oscillation amplitude would decrease $R_t$ thus reducing the transfer impedance $Z_t$ of the coupling network, with the result that the oscillation amplitude would decrease again. The reverse effect would occur if the oscillation amplitude should decrease. Thus stabilisation of the amplitude is obtained without making use of the limiting properties of the valve, and thus without producing harmonics with the consequent variable operation which results therefrom.

It is to be noted that the condition $$\frac{1}{X_1}+\frac{1}{X_2}=0$$

determines the frequency of oscillation, and does not involve any of the resistance components of the circuit, or the mutual conductance $g$. Thus the changes in $R_t$ which occur during stabilisation do not affect the frequency. Equation 5 also indicates what was stated above, namely that the condition cannot be fulfilled unless $g$ is negative.

Figure 3:
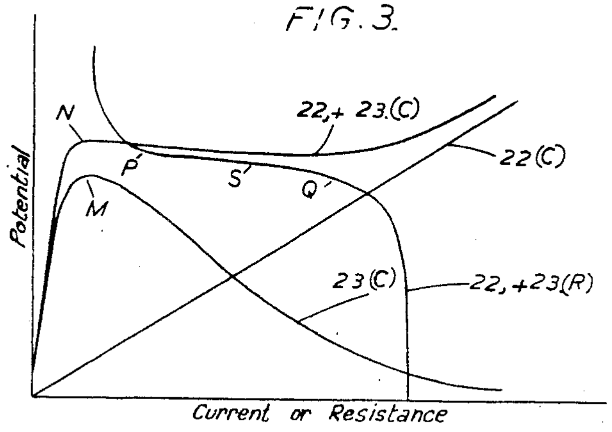
Fig. 3 shows thermistor curves used to explain the stabilising action.

The manner in which stabilisation takes place will be understood from the curves of Fig. 3. The ordinates represent the potential across the terminals of the resistances 22 and/or 23, and the abscissae represent the corresponding current or resistance. The curved marked 23(C) is the well known current-voltage characteristic of a thermistor with a negative temperature coefficient, and exhibits the potential maximum M which occurs at the early part of the curve. The straight line 22(C) is the corresponding current-voltage characteristic for the constant resistance 22, and the curve 22+23(C) obtained by adding the ordinates of the two curves 22(C) and 23(C) is the characteristic curve for the combination of the elements 22 and 23. By suitably choosing the value of the resistance 22, the combined curve may be given a relatively flat vertical portion with a fairly sharp corner N which occurs just above the maximum M of the curve 23C).

The curve marked 22+23(R) gives the relation between the resistance and the potential difference across the combination of the elements 22 and 23. The resistance has a relatively large value for zero voltage, which becomes smaller as the voltage increases owing to the reduction in resistance of the thermistor as it becomes heated. The reduction in resistance is at first slow, but in the voltage region corresponding to the corner N the reduction is very rapid, and so the middle portion PQ of the curve is nearly horizontal. At higher voltages the reduction in resistance is again smaller and the resistance tends towards an asymptotic value equal to the resistance of the element 22.

The circuit elements should preferably be so proportioned that Equation 5 is satisfied for a resistance value of the combination 22+23 which corresponds to a value S somewhere on the portion PQ of the curve 22+23(R). Then when the valve is first switched on, the thermistor 23 being cold, oscillations will commence since the transfer impedance $Z_t$ of the coupling network is at first larger than the final stabilising value. The thermistor then heats up and the resistance falls to the value corresponding to the point S at which Equation 5 is satisfied. The amplitude of the oscillations changes at the same time and stabilises at the voltage corresponding to this value. Any further change in the amplitude would cause the thermistor to heat or cool and its resistance to change in such manner as to restore the amplitude of the oscillations. It will be evident that by choice of the portion PQ of the curve for stabilising, the control will be very close since a large change in resistance results from a very small change in the applied voltage. It is possible in this way to arrange for the resistance to change by a factor of about 10 for a change in voltage of about 25% (corresponding to a power output change of about 2 decibels).

It will be understood that should any of the resistances involved in Equation 5 tend to vary for any reason, a compensating change will occur in the resistance of the thermistor, the point S moving along the nearly flat portion PQ. A negligible change in output voltage occurs, and as explained above, there will be no change in the frequency.

The valve 4 and its biassing arrangements should preferably be chosen so that it is able to oscillate at the level corresponding to the stabilising voltage without overloading, that is so that only the linear portion of the corresponding characteristic curve is used. In this way the limitation of the amplitude of oscillation is effected by the thermistor above without the introduction of harmonics, and so stability of both frequency and amplitude is ensured.

It is further to be noted that the oscillations frequency may be changed over a wide range, for example by adjusting the condenser 21, without producing any appreciable change in the oscillation amplitude or frequency stability, since the resulting changes (if any) in the value of $R_7$ will also be compensated by the thermistor, without affecting the frequency.

Two other embodiments of the invention which will now be described, satisfy the Equation 3 in a different way, the impedance $Z_3$ not being zero this time.

It can easily be shown that if the impedances of the coupling network are chosen so that either $$X_2/R_2 = X_3/R_3$$

or $$X_1/R_1 = X_3/R_3$$

(that is, by making the angle of the impedance $Z_3$ the same as that of $Z_1$ or $Z_2$), then the conditions for satisfying Equation 3 reduce to $$X_1 + X_2 + X_3 = 0$$

and $$g + \frac{R_1 + R_2 + R_3}{R_1 R_3} = 0 \qquad (6)$$

Thus as before, the conditions for determining the frequency depend only on the reactances of the circuit, and the thermistor or other temperature dependent resistance, which is included in one of the shunt resistances R, will stabilise the amplitude of oscillation according to Equation 6 without affecting the frequency.

Figure 4:
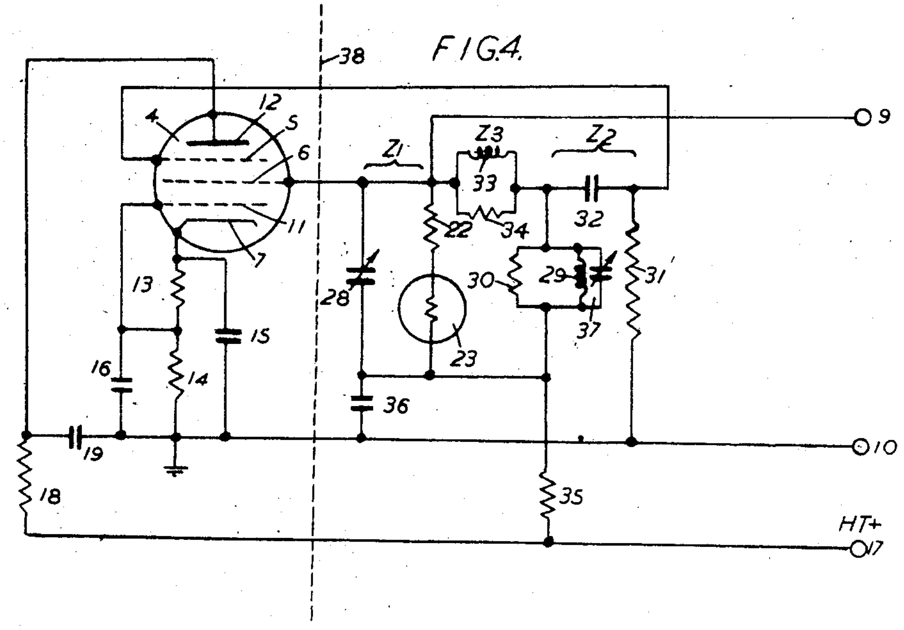
Figs. 4, 5, 6 and 7 show schematic circuit diagrams of other embodiments of the invention.

Fig. 4 shows an embodiment of the invention in which $X_2/R_2 = X_3/R_3$. The elements in Fig. 4 which are the same as those of Fig. 1 have been given the same designations. In the case of Fig. 4 the valve interelectrode impedances have been omitted to avoid complicating the figure, but it may be assumed that they are present as described with reference to Fig. 2. The shunt impedance $Z_1$ of the coupling network comprises the resistance 22 and thermistor 23 in series shunted by an adjustable condenser 28. The shunt impedance $Z_2$ consists of an inductance 29 shunted by a resistance 30, and a high resistance 31 which serves to connect the suppressor grid 5 to ground. These latter elements are coupled at the upper end by a large blocking condenser 32 which can be regarded as having zero impedance at the oscillation frequency and is provided to separate the suppressor grid 5 and screen grid 6 as regards the polarising potentials. The impedance $Z_3$ comprises another inductance 33 shunted by a resistance 34. The resistances 30 and 34 are supposed to include the effect of the resistances of the corresponding inductances, and should be chosen so that the phase angles of the impedances $Z_2$ and $Z_3$ are equal. Either or both of the resistances may be unnecessary.

The screen grid current is supplied from the positive high tension terminal 17 through a resistance 35 and through the inductances 29 and 33. A small fraction of the screen grid current also flows through the thermistor 23, but as the resistances of these inductances will usually be small compared with those of the elements 22 and 23, this small fraction of current will most probably be insufficient to affect the performance of the thermistor appreciably. If this should not be the case, a large blocking condenser (not shown) may be connected in series with the thermistor. A by-pass condenser 36 is provided to connect the elements 23 and 29 to ground.

It will be noted that the inductances 29 and 33 are each shunted by the corresponding interelectrode capacity of the valve 4. As it is desirable that the phase angles of the impedances $Z_2$ and $Z_3$ should remain the same at all frequencies, a small adjustable trimming condenser 37 is provided to shunt the inductance 29. It is intended that this condenser shall be adjusted so that the ratio of the capacities which effectively shunt the elements 29 and 33 should be in the inverse ratio of their inductances. Since the capacity between the electrodes 5 and 11 is likely to be very much smaller than that between the electrodes 5 and 6 the necessary adjustment can most probably be obtained with the trimming condenser 37 in the position shown. If not, it can be connected across the element 33 instead, or trimming condensers could be connected across both inductance elements.

The oscillation output is obtained from the output terminals 9 and 10. It will be seen that as in the case of Fig. 2, the output terminal 9 is connected to the branch containing the thermistor. The advantage of this arrangement is that the thermistor automatically compensates for changes in the output load resistance. In the case of either Fig. 2 or Fig. 4 the output could if desired be taken from the other end of the coupling network, but the arrangement shown is preferable.

It will be clear that having adjusted the angles of the impedance $Z_2$ and $Z_3$ to equality, the frequency will be that for which the above condition $X_1 + X_2 + X_3 = 0$ is satisfied. The frequency may be changed by adjusting the condenser 28. The amplitude of the oscillation is then determined by the Equation 6, and the various circuit resistances should be chosen as before so that stabilisation occurs over the portion PQ of the resistance curve of Fig. 3.

Figure 5:
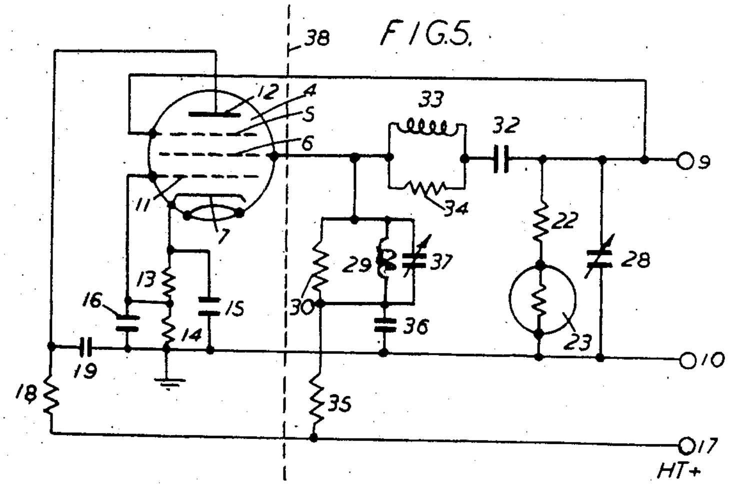

Fig. 5 shows a modification of Fig. 4 in which the phase angles of the impedances $Z_1$ and $Z_3$ are made equal. It will be seen that the elements 29, 30 and 37 are interchanged with 22, 23 and 28, the resistance 31 being omitted since it is not now required. The blocking condenser 32 is now directly in series with the elements 33 and 34 and so forms part of $Z_3$ instead of $Z_2$. Its effect will, however, be negligible provided it is large enough. The arrangement should otherwise fulfil the same condition as that of Fig. 4. As in the case of Fig. 4, the trimming condenser 37 may be connected in parallel with the inductance 33 instead of 29, or two trimming condensers can be used. The output is taken from the terminals 9 and 10 connected to the thermistor branch of the coupling network.

The arrangements of Figs. 4 and 5 will produce substantially the same results, but one may be more convenient than the other as regards the choice of the thermistor. In Fig. 4, the thermistor stabilises the screen grid voltage, and in Fig. 5 it stabilises the suppressor grid voltage. This means that in the first case the stabilising voltage of the thermistor can be higher than in the second case.

A possible though less convenient modification of Fig. 4 or 5 may be obtained by replacing the elements 29 and 33 by condensers and the element 28 by a variable inductance. The trimming condenser 37 would in this case not be required.

It will be evident that there are other arrangements of the coupling network besides those shown which will meet the requirements of Equation 1 or 3. At least one of the shunt impedances $Z_1$ or $Z_2$ must include a temperature dependent resistance.

Figure 6:
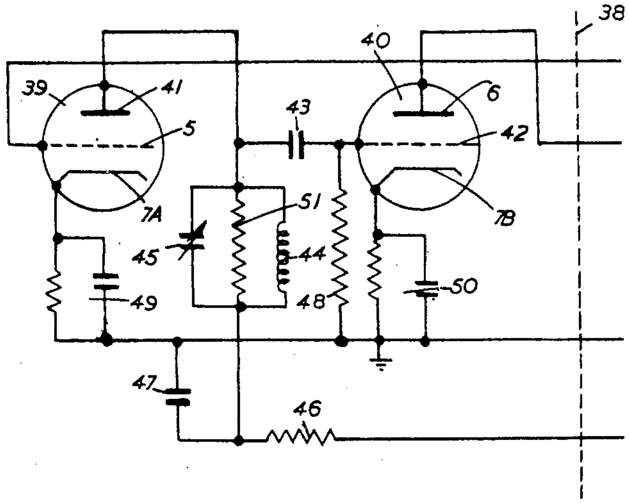

It is to be noted that two normally operated valves may be arranged effectively as a discharge device having a negative mutual conductance. An example is shown in Fig. 6, which indicates how the arrangement to the left hand side of the dotted line 39 of Fig. 4 or 5 may be modified to employ two ordinary triodes, the elements to the right hand side of the dotted line being unaltered. Fig. 2 can also be modified in a similar way. In Fig. 6 the two triodes are designated 39 and 40. The two cathodes are designated 7A and 7B and together correspond to the cathode 7 in Fig. 4. The control grid of the valve 39 corresponds to the input electrode 5, and the anode of the valve 40 corresponds to the output electrode 6. The anode 41 of the valve 39 is coupled to the control grid 42 of the valve 40 through a blocking condenser 43 and is supplied with anode current from the high tension terminal 17 (Fig. 4) through a parallel resonant circuit comprising an inductance 44 and a condenser 45 and through a decoupling resistance 46, the corresponding by-pass condenser being 47. The control grid 42 is connected to earth through a high resistance 48, and the two cathodes are biassed positively by means of the usual networks 49 and 50. The parallel resonant circuit should be tuned to the desired oscillation frequency, for example by adjusting condenser 45. This tuned circuit may be shunted by a resistance 51 whose value is supposed to include the shunt effective resistance of the inductance 44, and the internal anode resistance of the valve 39.

Let $g_1$ and $g_2$ be the mutual conductances of the valves 39 and 40 respectively, both being positive. Then if a voltage $v$ be applied to the control grid 5, the voltage applied to the control grid 42 will be $-vg_1R_7$, where $R_7$ is the value of the parallel combination of the resistances 51 and 48 and the internal anode-cathode resistance of the valve 39 and the internal control grid-cathode resistance of the valve 40. The effective output current from the anode 6 will accordingly be $+vg_1g_2R_7$; so that the effective mutual conductance of the combination from the input electrode 5 to the output electrode 6 will be equal to $-g_1g_2R_7$, and has the desired negative sign.

It will be seen that the anode cathode capacity of the valve 39 and the control grid cathode capacity of the valve 40 are effectively in parallel with the condenser 45 and so they will both be taken into account in the adjustment of the condenser 45. Although in Fig. 6 the valves 39 and 40 have been shown as triodes, in practice it will usually be preferable to use pentodes, or tetrodes. In this case the extra grids may be suitably polarised in any well known way. These details have not been shown in order to avoid complicating the figure.

Figure 7:
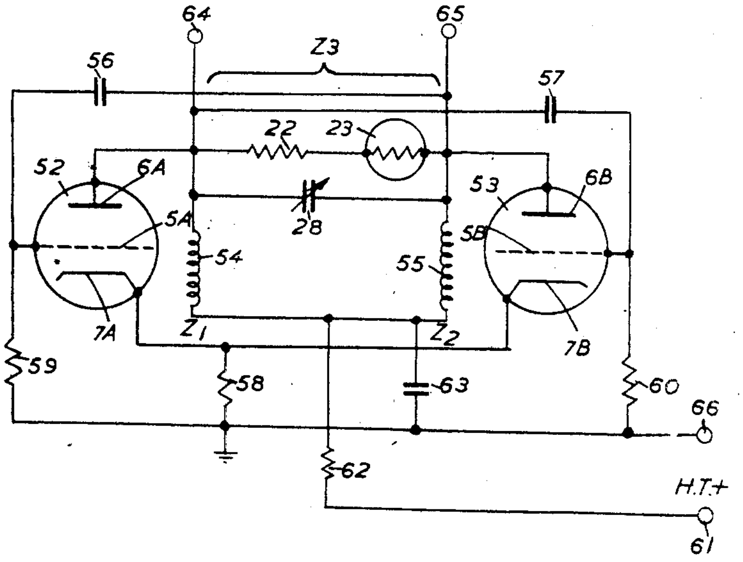

Fig. 7 shows a rather different arrangement according to the invention in which the oscillation requirements are fulfilled without the use of a device having a negative mutual conductance. The circuit is a push-pull arrangement of two triodes 52 and 53 having mutual conductances $g_1$ and $g_2$. The coupling network comprises two shunt impedances $Z_1$ and $Z_2$ represented by the inductances 54 and 55 and a series impedance $Z_3$ represented by the resistance 22 and thermistor 23 shunted by the adjusting condenser 28. The thermistor should have a negative temperature coefficient of resistance. The output electrode or anode 6A of the valve 52 is connected to the junction point of impedances $Z_1$ and $Z_3$, and the input electrode or control grid 5A is connected through a blocking condenser 56 to the junction point of $Z_2$ and $Z_3$. Likewise the anode 6B of the valve 53 is connected to the junction point of $Z_2$ and $Z_3$, and the control grid 5B is connected through a blocking condenser 57 to the junction point of $Z_1$ and $Z_3$. The cathodes 7A and 7B are connected to earth through a common resistance 58 and the control grids 5A and 5B are connected to earth through respective resistances 59 and 6. Anode current for both valves is supplied from terminal 61 through a resistance 62 and through the respective inductances 54 and 55. The corresponding by-pass condenser is 63.

The oscillations may be taken from the terminals 64 and 65 connected respectively to the two anodes, if a balanced output is desired. Alternatively, an unbalanced output can be obtained from either of these terminals and the ground terminal 66. In either case it is desirable to couple the output to a high impedance load circuit such as a valve grid circuit.

It is of course understood that each of the Z impedances includes the interelectrode valve impedances with which it is connected in parallel. Thus $Z_1$ and $Z_2$ each include the anode-cathode impedance of one valve and the control grid-cathode impedance of the other, and $Z_3$ includes the anode-control grid impedances of both the valves. The latter being substantially a capacity may be directly included in the adjustable condenser 28.

The two inductances 54 and 55 should preferably be inductively uncoupled, though in some cases they could be coupled without any objection, for example when it is arranged so that $Z_1=Z_2$ and $g_1=g_2$.

It can be shown by determining the distribution of the currents in the coupling network that the condition for the maintenance of oscillations is $$(g_1+g_2)Z_1Z_2+Z_1+Z_2+Z_3(1-g_1g_2Z_1Z_2)=0 \quad (7)$$

in which $g_1$ and $g_2$ are the mutual conductances of the triodes 52 and 53, respectively. Although it is not essential, it is preferable to arrange so that for a balanced push-pull circuit of this kind $g_1=g_2=g$ and $Z_1=Z_2=Z$, in which case the condition (7) simplifies to $$2Z+Z_3(1-gZ)=0 \qquad (8)$$

By substituting as before $$\frac{1}{Z}=\frac{1}{R}+\frac{1}{jX}$$

and $$\frac{1}{Z_3}=\frac{1}{R_3}+\frac{1}{jX_3}$$

condition 7 reduces to $$\frac{2}{X_3}+\frac{1}{X}=0 \qquad (9)$$

$$\frac{2}{R_3}+\frac{1}{R}=f \qquad (10)$$

Thus as before, the frequency is determined by the reactances alone and is not affected either by the circuit resistances or the mutual conductance of the valves. It is also to be noted that the conditions can be satisfied with a positive of $g$. The amplitude of the oscillations is controlled by the thermistor 23 in accordance with Equation 10 since it forms part of $R_3$.

It can also be shown that if the conditions are chosen so that $$g_1/g_2=X_2/X_1=R_2/R_1$$

or so that $$g_1/g_2=X_1/X_2=R_1/R_2 \qquad (11)$$

then the frequency is determined only by the circuit reactances and control of the amplitude by the thermistor does not affect the frequency, nor will variations in the mutual conductances of the valves.

It will be evident that the conditions for oscillation could also be satisfied by replacing the elements 54 and 55 by condensers and the element 28 by an inductance any or all of which could be made adjustable in any convenient way.

In the balanced arrangement of Fig. 7, there is no need to provide a by-pass condenser to shunt the cathode resistance 58 because there will be no variation in the current flowing through it, since the sum of the cathode currents of the two valves is substantially constant. This is not necessarily true in other cases and then the usual by-pass condenser may be required.

It will be evident that pentodes or tetrodes can be used for the valves 52 and 53, the additional grid or grids being connected and polarised in one of the well known ways.

It is to be noted that a temperature dependent resistance or thermistor is not the only kind of device which could be used for stabilising the amplitude of the oscillations according to the invention. Thus, referring again to Equation 5, this condition could be satisfied, for example by varying $g$ instead of $R_t$. Thus if the valve 4 in Fig. 2 is of the variable mu type, the voltage across the input or output of the coupling network could be rectified and smoothed and applied to the valve 4 in the manner of an automatic gain control circuit to vary $g$ in the proper sense to counteract any change in amplitude. Alternatively a grid controlled valve could be arranged to act as the variable resistance $R_t$, and the rectified oscillator voltage could be applied after sufficient smoothing to the grid to control the valve. These principles could be applied to any of the circuits which have been described.

In any of the arrangements described the thermistor 23 may be replaced by a series and/or parallel combination of several thermistors which may have the same or different characteristics. In this way a more suitable stabilising characteristic may be obtained when, for example, the number of different available types of thermistors is limited. When the term "thermistor" is used in the claims, therefore, it is to be understood to include a single thermistor or a combination of several.

What is claimed is:

1. An arrangement for generating electrical oscillations comprising an electronic amplifier having a negative resistance characteristic and comprising input and output circuits, means for sustaining oscillations in said amplifier comprising a coupling circuit for coupling energy from said output to said input circuit, said coupling circuit comprising series and shunt branch reactance and resistance elements so related in values that the frequency of oscillation of said amplifier is dependent substantially upon the values of said reactance elements, and one of said branches comprising means controlled by the voltage across said one branch for stabilising the amplitude of oscillations of said amplifier.

2. An arrangement according to claim 1, wherein said means for stabilising comprises a resistance element having a negative co-efficient of resistance with temperature.

3. An arrangement according to claim 2, wherein said reactance elements comprise an adjustable tuning element for tuning said coupling circuit to a desired oscillation frequency.

4. An arrangement according to claim 3, wherein said coupling circuit comprises a $\pi$ network.

5. An arrangement according to claim 4, wherein said stabilising means comprises a shunt branch of said $\pi$ network and at least one of the said other branches comprises an adjustable parallel tuned circuit.

6. An arrangement according to claim 1, wherein said amplifier comprises an electron discharge device having a plurality of control grid electrodes and a cathode electrode, and said input and output circuits each comprise a separate one of said grid electrodes and said cathode electrode.

7. An arrangement according to claim 1, wherein said amplifier comprises an electron discharge device of the pentode type, said input circuit comprises a cathode electrode and a suppressor electrode and the said output circuit comprises a cathode electrode and a screen electrode.

8. An arrangement according to claim 7, wherein said coupling circuit comprises a $\pi$ network.

9. An arrangement according to claim 8, wherein the shunt branch of said $\pi$ network coupled to said screen electrode comprises a parallel tuned circuit, and the shunt branch of said network connected to said suppressor electrode comprises a resistance having a negative coefficient of resistance with temperature.

10. An arrangement according to claim 9, wherein the series branch of said $\pi$ network comprises an impedance circuit, the phase angle of said impedance circuit being equal to the phase angle of the shunt branch connected to said screen electrode.

11. An arrangement for generating electrical oscillations comprising an electronic amplifier having input and output circuits, said amplifier comprising an electron discharge device of the pentode type, said input circuit comprising a cathode electrode and a suppressor electrode, said output circuit comprising a cathode electrode and a screen electrode, means for sustaining oscillations in said amplifier comprising a coupling circuit for coupling energy from said output to said input circuit, said coupling circuit comprising a $\pi$ network having series and shunt branch reactance and resistance elements so related in values that the frequency of oscillation of said amplifier is dependent substantially upon the values of said reactance elements, the shunt branch of said $\pi$ network coupled to said screen electrode comprising means having a negative co-efficient of resistance with temperature for stabilizing the oscillations of said amplifier, the shunt branch of said $\pi$ network coupled to said suppressor electrode comprises a parallel tuned circuit.

12. An arrangement according to claim 11, wherein the series branch of said $\pi$ network comprises an impedance circuit whose phase angle is equal to the phase angle of said shunt branch connected to said suppressor electrode.

13. An arrangement according to claim 1, wherein said amplifier comprises two electron discharge devices each having a plate, control grid, and cathode electrode, said coupling circuit comprising a $\pi$ network having a series branch connected between said plate electrodes and having the shunt branches coupled between separate plate electrodes and a common connection of said cathode electrodes, the grid electrode of each device being coupled to the plate electrode of the other device.

14. An arrangement according to claim 13, wherein said series branch comprises an element having a negative co-efficient of resistance with temperature shunted by an adjustable reactance circuit for controlling the frequency of oscillation, and means for removing energy from said oscillator circuit coupled across said series branch.

15. An arrangement according to claim 1, wherein said coupling circuit comprises a $\pi$ network, one shunt branch of said $\pi$ network comprising an adjustable tuning element for tuning said coupling circuit to a desired oscillation frequency, the other shunt branch of said $\pi$ network comprising said stabilising means, said amplifier comprising two electron discharge devices coupled in cascade through a parallel resonant circuit, said coupling circuit having one end coupled to the output circuit of one of said electron discharge devices and the other end coupled to the input circuit of the other of said electron discharge devices, the series branch of said $\pi$ network comprising an impedance circuit having a phase angle equal to the phase angle of a shunt branch of said $\pi$ network.

GASTON PAKENHAM DE MENGEL.

REFERENCES CITED

The following references are of record in the file of this patent:

UNITED STATES PATENTS

| Number | Name | Date |
|---|---|---|
| 2,066,333 | Carrthers | Jan. 5, 1937 |
| 2,226,561 | Herold | Dec. 31, 1940 |
| 2,258,128 | Black | Oct. 7, 1941 |
| 2,259,945 | Velia | Oct. 21, 1941 |
| 2,341,067 | Wise | Feb. 8, 1944 |
| 2,407,293 | Shepherd | Sept. 10, 1946 |